United States Patent
Merlini

(10) Patent No.: US 10,701,953 B2
(45) Date of Patent: Jul. 7, 2020

(54) EQUIPMENT AND PROCESS FOR PROCESSING FOOD CREAMS

(71) Applicant: BIOENERGY ITALIA S.R.L., Bassano del Grappa (VI) (IT)

(72) Inventor: Iuri Merlini, Bassano del Grappa (IT)

(73) Assignee: BIOENERGY ITALIA S.R.L., Bassano del Grappa (VI) (IT)

(*) Notice: Subject to any disclaimer, the term of this patent is extended or adjusted under 35 U.S.C. 154(b) by 44 days.

(21) Appl. No.: 15/533,022

(22) PCT Filed: Dec. 4, 2015

(86) PCT No.: PCT/IB2015/002335
§ 371 (c)(1),
(2) Date: Jun. 4, 2017

(87) PCT Pub. No.: WO2016/087933
PCT Pub. Date: Jun. 9, 2016

(65) Prior Publication Data
US 2017/0360062 A1    Dec. 21, 2017

(30) Foreign Application Priority Data

Dec. 4, 2014  (IT) .............................. PD2014A0336

(51) Int. Cl.
*A23G 9/12*   (2006.01)
*A23G 9/04*   (2006.01)
(Continued)

(52) U.S. Cl.
CPC ............... *A23G 9/283* (2013.01); *A23G 9/12* (2013.01); *A23G 9/224* (2013.01); *A23G 9/28* (2013.01)

(58) Field of Classification Search
CPC .................................. A23G 9/12; A23G 9/224
See application file for complete search history.

(56) References Cited

U.S. PATENT DOCUMENTS

| | | | | |
|---|---|---|---|---|
| 4,632,566 A | * | 12/1986 | Masel .................... | A23G 9/163 366/102 |
| 4,643,583 A | * | 2/1987 | Cecchini ................ | A23G 9/106 366/149 |

(Continued)

FOREIGN PATENT DOCUMENTS

| GB | 852999 A | 11/1960 |
|---|---|---|
| JP | S63119380 U | 8/1988 |

(Continued)

*Primary Examiner* — Dana Ross
*Assistant Examiner* — Lawrence H Samuels
(74) *Attorney, Agent, or Firm* — Mark M. Friedman

(57) ABSTRACT

Equipment for processing food creams, which comprises a tub (11) housed in a removable manner inside a containment structure (2) and comprising a side wall (15), which is provided at the top with an access aperture (20) for loading the cream and is closed at the bottom by a bottom wall (17) provided with an exit aperture (22), through which the cream is dispensed outside the tub (11); cooling means (21) operatively associated with the tub (11) to absorb heat from the cream; an obturator (23) operatively connected to the bottom wall (17) of the tub (11) and movable between a closed position, in which it occludes the exit aperture (22) of the bottom wall (17), and an open position, in which it leaves the opening of the exit aperture (22) free in order to allow the cream to come out of the tub (11); a mixing body (30), rotatably housed inside the tub (11) and provided with a thrust surface (31) tilted and facing towards the bottom wall (17) of the tub (11); moving means (32) mechanically connected to the mixing body (30) and operable, when the obturator (23) is in the open position, to make the mixing body (30) rotate in a first direction of rotation (R1) in which the thrust surface (31) pushes the cream to descend through the exit aperture (22) of the bottom wall (17) of the tub (11).

10 Claims, 9 Drawing Sheets

(51) Int. Cl.
  *A23G 9/22* (2006.01)
  *A23G 9/28* (2006.01)

(56) References Cited

U.S. PATENT DOCUMENTS

| | | | | |
|---|---|---|---|---|
| 4,796,440 | A * | 1/1989 | Shiotani | A23G 9/12 |
| | | | | 222/227 |
| 4,910,973 | A * | 3/1990 | Osrow | A23G 9/14 |
| | | | | 366/149 |
| 6,089,747 | A * | 7/2000 | Huang | A23G 9/12 |
| | | | | 366/149 |
| 6,205,806 | B1 * | 3/2001 | Huang | A23G 9/12 |
| | | | | 366/309 |
| 6,250,794 | B1 * | 6/2001 | Huang | A23G 9/12 |
| | | | | 366/149 |
| 7,451,613 | B2 * | 11/2008 | Barraclough | A23G 9/08 |
| | | | | 222/146.6 |
| 9,894,912 | B2 * | 2/2018 | Jacobsen | A23G 9/045 |
| 2008/0202130 | A1 * | 8/2008 | Kadyk | A23G 9/045 |
| | | | | 62/68 |
| 2011/0209630 | A1 * | 9/2011 | Grotti | A23G 9/04 |
| | | | | 99/484 |
| 2015/0245635 | A1 * | 9/2015 | Smith | A23G 9/106 |
| | | | | 426/519 |
| 2016/0255858 | A1 * | 9/2016 | Noth | A23G 9/04 |
| 2016/0353766 | A1 * | 12/2016 | Jacobsen | A23G 9/045 |

FOREIGN PATENT DOCUMENTS

| | | |
|---|---|---|
| JP | H0787898 A | 4/1995 |
| JP | 2004313182 A | 11/2014 |
| WO | 2011048568 A1 | 4/2011 |
| WO | 2012119962 A1 | 9/2012 |

\* cited by examiner

EQUIPMENT AND PROCESS FOR PROCESSING FOOD CREAMS

FIELD OF APPLICATION

The object of the present invention is equipment and a process for processing food creams, according to the preamble of the relative independent claims.

The present equipment and the process are inserted in the food sector, in particular in the confectionary field, and are intended to be advantageously employed in dining establishments (such as bar, restaurants, confectionery shops, etc.) in order to process food creams, such as in particular mascarpone cream, so as to prepare food products such as in particular desserts like tiramisu.

Advantageously, the present equipment and the process are intended to be used for restoring and maintaining the organoleptic properties of food creams preserved via freezing, and for dispensing such creams for the purpose of preparing the dessert to be served.

STATE OF THE ART

There is the particular need in the dining sector (e.g. in restaurants, bars, etc.) to serve confectionary products that are already prepared, having qualities substantially equal to those of freshly prepared products.

In particular, there is the need to be able to serve desserts, such in particular tiramisu, whose cream has substantially the same properties of a freshly prepared product.

The pre-packaged desserts currently present on the market do not at all have organoleptic properties that allow ensuring a taste of the product comparable with those of a fresh product.

In addition, the currently known equipment, used in bars or restaurants in order to preserve and prepare ice cream or coffee creams, are unable to process creams for desserts, such as in particular mascarpone creams for tiramisu, in a manner such to ensure the correct maintenance of the cream itself.

For example, equipment is known for maintaining and dispensing coffee creams (or even sorbets, ices, etc.) which comprise a containment tub made of polycarbonate, with cylindrical form, the coffee cream being preserved therein. Such tub is extended with horizontal axis between a rear end and a front end, from which a dispensing lip is projectingly extended. Such lip is provided with an outlet mouth directed downward, through which the cream is metered onto a container, e.g. a jar, arranged below the outlet mouth itself. In particular, the equipment is provided with an obturator inserted in the dispensing lip and movable, e.g. by means of an actuation lever, to vertically move between an interference position in which it obstructs the outlet mouth of the dispensing lip, and a non-interference position in which it is raised from the outlet mouth, allowing the cream coming from the containment tub to fall via gravity outside the dispensing lip.

In addition, the aforesaid equipment of known type comprises a cooling circuit in order to maintain the cream contained in the tub at a temperature lower than zero. Such circuit comprises an evaporator arranged inside the containment tub, and provided with a hollow body of metal material traversed by a cooling fluid, which absorbs, through the walls of the hollow body, heat from the cream in order to maintain it at the desired temperature.

In addition, the equipment comprises a helical impeller coaxially arranged around the hollow body of the evaporator and operable to rotate in order to mix the cream itself, for the purpose of making the temperature and density uniform.

A first drawback of the above-described equipment of known type is due to the fact that the cream part which, when the obturator is closed, remains inside the dispensing lip, is not suitably cooled by the evaporator nor is it suitably mixed by the helical impeller, with a consequent heating and breaking down of the cream. This leads to the degradation of the organoleptic properties.

A further drawback of the above-described equipment of known type is due to the fact that the cream layer in direct contact with the cylindrical body of the evaporator tends to crystallize on the outer surface of the cylindrical body itself, with consequent degradation of the quality of the cream. In addition, the helical impeller substantially rotates by skimming over the outer surface of the cylindrical body of the evaporator, packing the crystallized cream layer on the outer surface itself and creating a patina that remains inside the containment tub, with consequent further degradation of the cream and the need to execute frequent cleaning operations of the tub.

In addition, the tub cleaning operations are inconvenient and difficult to carry out, since the operator must manually wash the interior of the tub, in particular with his/her movements obstructed due to the presence of the evaporator.

A further drawback of the above-described equipment of known type is due to the fact that it is not suitable for dispensing mascarpone creams that have in particular high viscosity, since such creams are unable to fall via simple gravity from the dispensing lip of the equipment with suitable flow rate.

PRESENTATION OF THE INVENTION

The problem underlying the present invention is therefore that of eliminating the drawbacks of the abovementioned prior art, by providing equipment and a process for processing food creams which allow maintaining and metering the cream, even in a single portion, with the desired organoleptic properties. In particular, the present equipment and the process allow serving, in dining establishments, desserts obtained with creams produced in the laboratory, frozen in order to be transported and preserved at the dining establishment, in particular allowing the restaurant owner to unfreeze the required portion of cream and maintain it in conditions such to ensure, at the time of dispensing of the cream, organoleptic properties of the latter substantially equal to those of a fresh product.

A further object of the present invention is to provide equipment and a process for processing food creams which allow maintaining the main organoleptic characteristics of the cream (such as the density and temperature) substantially constant both over time and in space.

A further object of the present invention is to provide equipment for processing food creams that is simple and quick to clean.

A further object of the present invention is to provide equipment for processing food creams that is usable in a convenient and practical manner in dining establishments such as restaurants, bar, pizzerias, confectionery shops, etc.

A further object of the present invention is to provide equipment for processing food creams that is structurally simple and entirely reliable in operation.

BRIEF DESCRIPTION OF THE DRAWINGS

The technical characteristics of the invention, according to the aforesaid objects, can be clearly seen in the contents of the below-reported claims and the advantages thereof will be more evident in the following detailed description, made with reference to the enclosed drawings, which represent a merely exemplifying and non-limiting embodiment of the invention, in which:

DETAILED DESCRIPTION OF A PREFERRED EMBODIMENT

With reference to the enclosed drawings, reference number 1 overall indicates the equipment for processing food creams, object of the present invention.

The equipment 1 and the process, object of the present invention, are advantageously intended for processing food creams comprising emulsions with high percentage of fatty components, such as in particular mascarpone creams, in order to prepare desserts such as the tiramisu.

In particular, the equipment 1 and the present process are intended to be used for restoring the organoleptic properties of food creams preserved via freezing, following the lowering of temperature, by maintaining, after the unfreezing of such creams, properties such as consistency, reticular stability, viscosity, temperature, etc., which confer to the cream a taste substantially equal to that of a fresh cream.

The present equipment 1 and the process also allow metering the cream for the preparation of one or more portions of a dessert to be served.

The equipment 1, object of the present invention, is preferably intended to be installed in the rooms of dining establishments (such as bars, restaurants, confectionery shops, ice cream parlors, pizzerias, etc.), displayed on the counter of the restaurant/shop (in order to allow the instantaneous preparation of desserts such as tiramisu) or in reserved areas such as kitchens, laboratories, etc.

In accordance with the embodiment illustrated in the enclosed figures, the present equipment 1 comprises a containment structure 2, with preferably box-like form, which is intended to be positioned on the abutment plane by means of, for example, its base feet 3.

Figure 1:
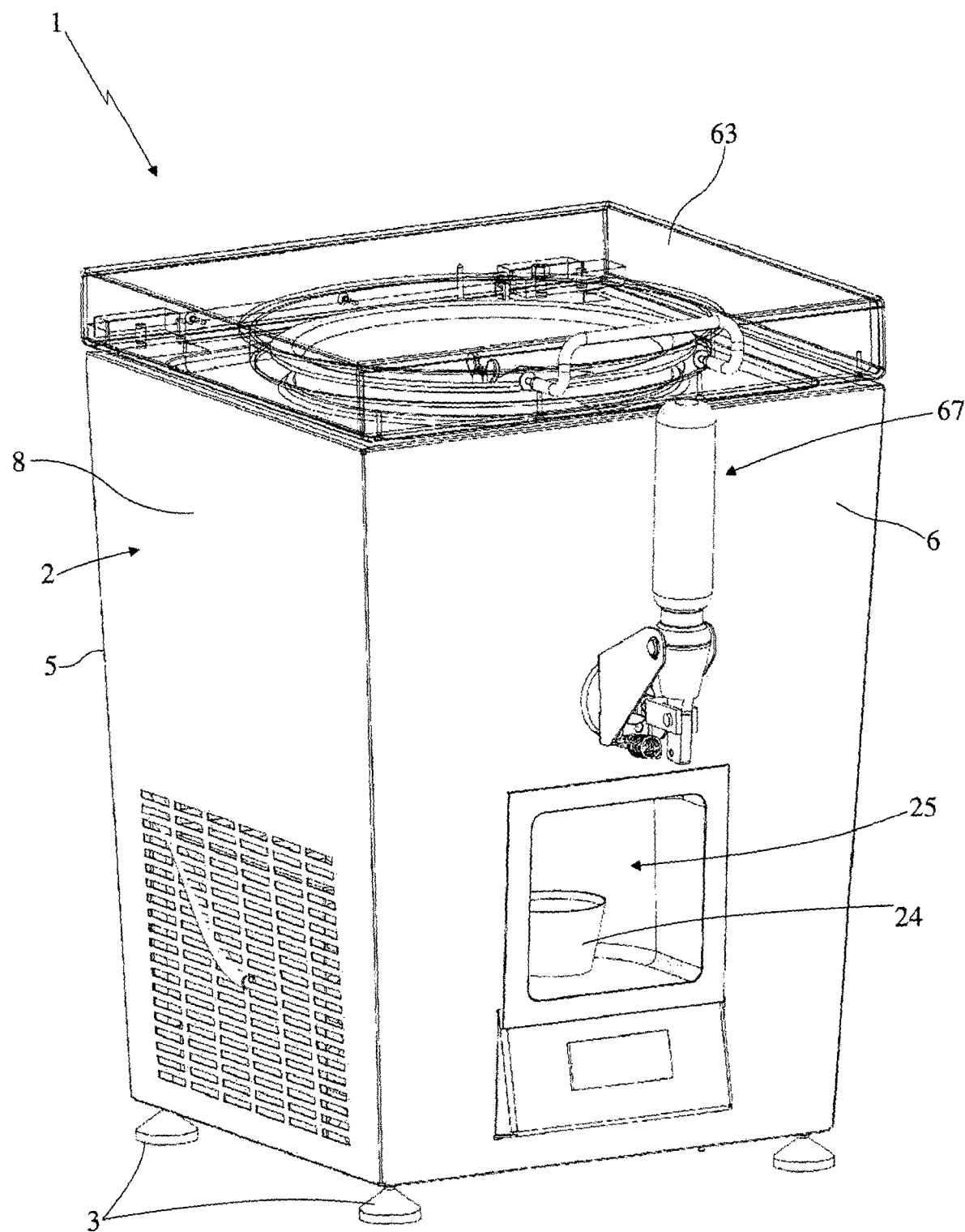
FIG. 1 illustrates a front perspective view of the equipment for processing food creams, object of the present patent application.
Figure 2:
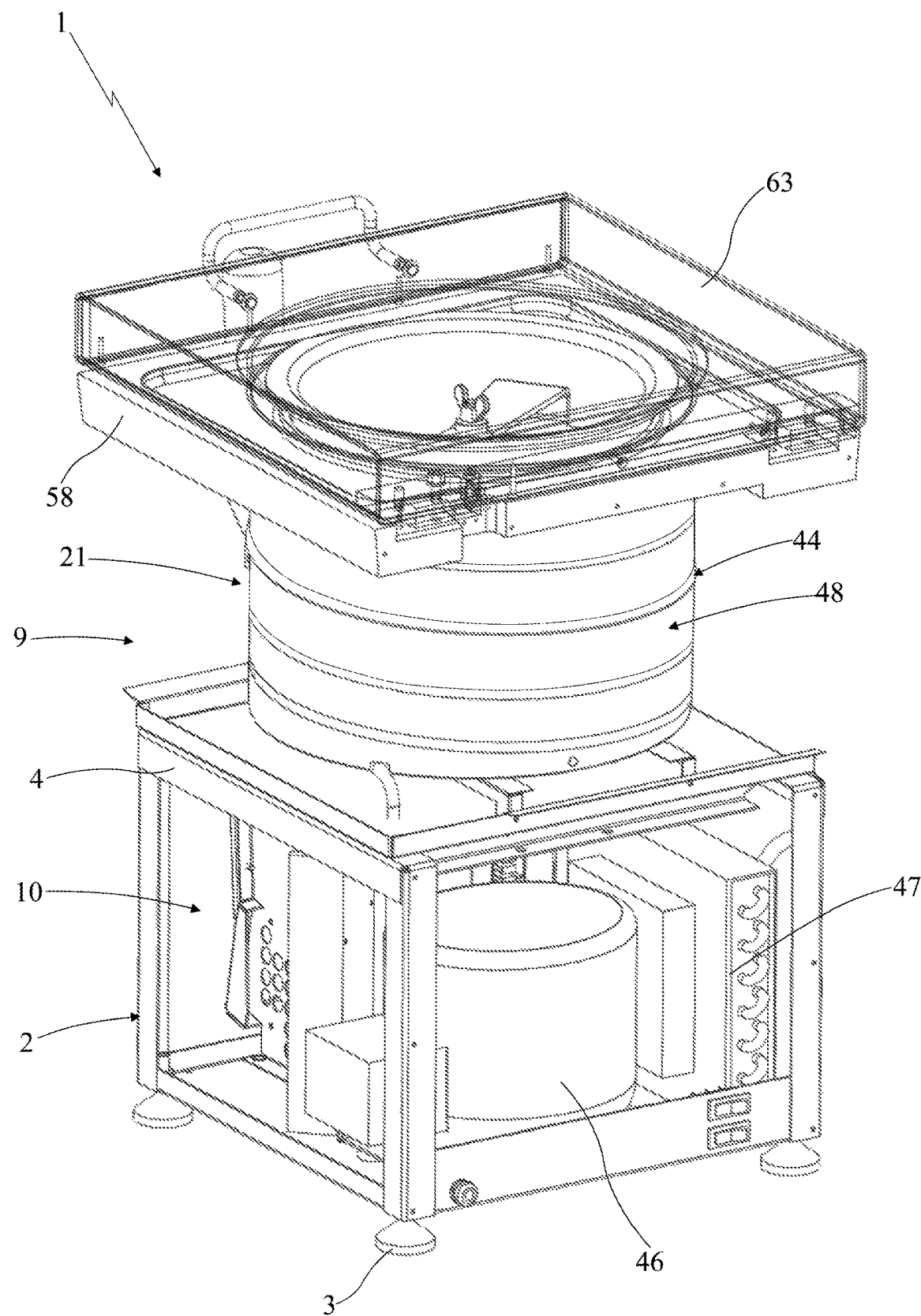
FIG. 2 illustrates a rear perspective view of the equipment, object of the present invention, with some parts removed in order to better illustrate other parts.

Preferably, in accordance with the embodiment illustrated in FIGS. 1 and 2, the containment structure of the equipment 1 comprises a metal framework 4, with substantially quadrangular form, closed by a protection casing 5 preferably obtained with multiple panels fixed to the sides of the framework 4 itself; such panels in particular include a front panel 6, a rear panel 7 and two side panels 8.

According to the invention, the containment structure 2 is provided with a process seat 9 and preferably with a housing seat 10, in particular arranged below the process seat 9.

The equipment 1 also comprises a tub 11 housed, preferably in a removable manner, in the aforesaid process seat 9, and provided with an outer surface 12 and with an inner surface 13 which delimits a compartment 14 designed to contain at least one cream to be processed.

Figure 4:
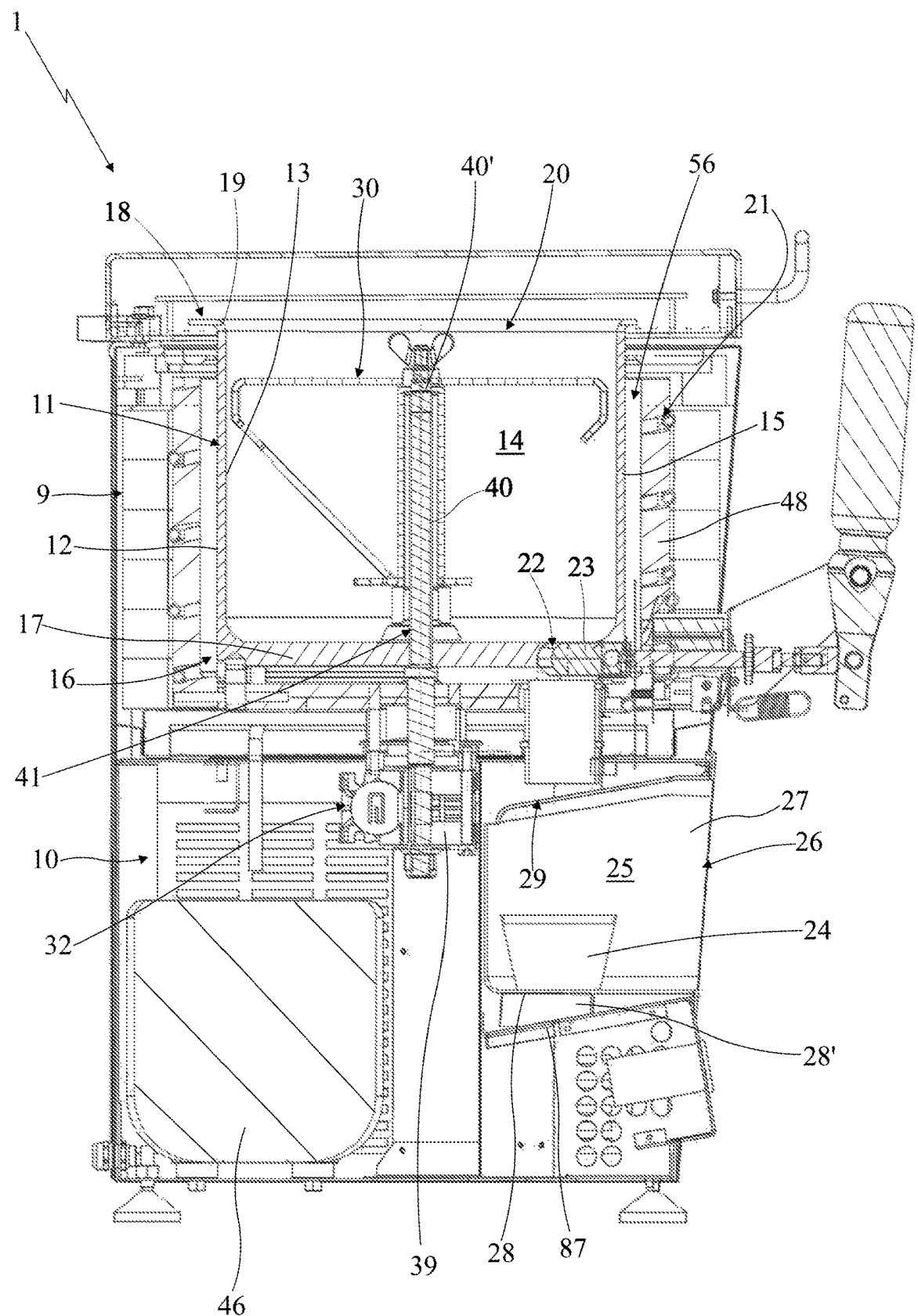
FIG. 4 illustrates a section view of the equipment illustrated in FIG. 3 along the line IV-IV of FIG. 3 itself.
Figure 5:
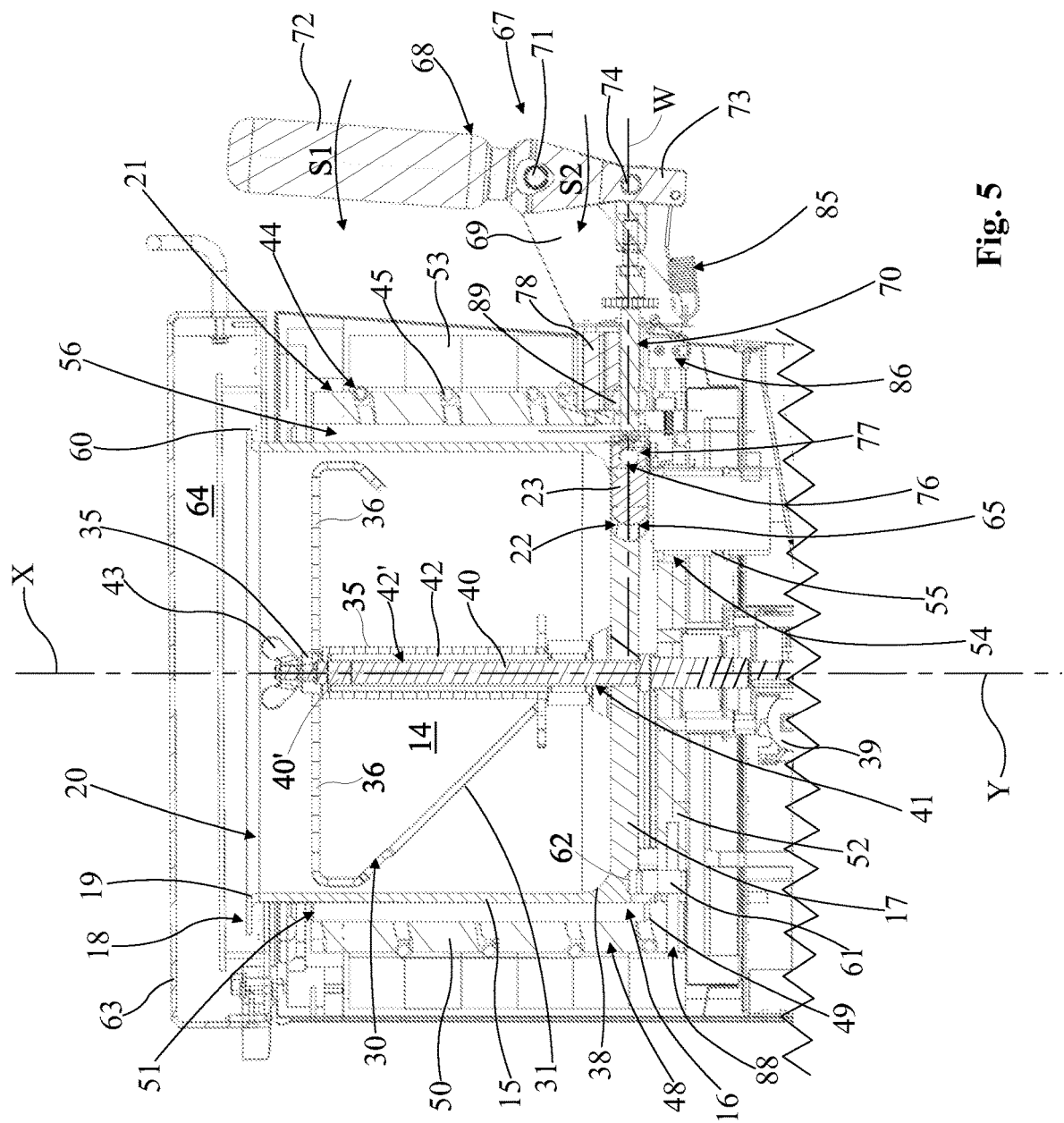
FIG. 5 illustrates a detail of the equipment illustrated in FIG. 4, relative to the upper part of the equipment itself.

More in detail, with reference to the embodiment illustrated in FIGS. 4 and 5, the tub 11 comprises a side wall 15, preferably with cylindrical form, which is extended around a substantially vertical extension axis X. Such side wall 15 is extended along the aforesaid extension axis X between a lower end 16, closed by a bottom wall 17, and an upper end 18 provided with an upper edge 19 which delimits an access aperture 20 through which the cream is intended to be inserted in the compartment 14 of the tub 11 itself.

According to the invention, the equipment 1 comprises cooling means 21 (described in detail hereinbelow) operatively associated with the compartment 14 of the tub 11 in order to transmit cooling energy to the cream so as to maintain the latter at a suitable processing temperature, preferably comprised between about −5° C. and +4° C.

The bottom wall 17 of the tub 11 preferably has substantially planar form and is provided with an exit aperture 22 through which the cream is dispensed outside the compartment 14 of the tub 11.

According to the invention, the equipment 1 also comprises an obturator 23 operatively connected to the bottom wall 17 of the tub 11 and movable between a closed position, in which the obturator 23 occludes the exit aperture 22 of the bottom wall 17, and an open position, in which the obturator 23 leaves the opening of the exit aperture 22 of the bottom wall 17 at least partially free in order to allow the cream to exit from the compartment 14 of the tub 11 and be dispensed for example inside a container 24, such as a jar, arranged aligned below the exit aperture 22 itself.

Advantageously, the equipment 1 comprises a dispensing compartment 25 made in the containment structure 2 of the equipment 1, inside which the container 24—into which the cream must be metered—is susceptible of being positioned.

The dispensing compartment 25 is preferably made in the housing seat 10 of the containment structure 2 and is positioned below the tub 11 at the exit aperture 22 of the latter.

In particular, the aforesaid dispensing compartment 25 is provided with a front opening 26, preferably obtained in the front panel 6 of the containment structure 2 and through which the container 24 is inserted in the dispensing compartment 25 itself.

Advantageously, the aforesaid dispensing compartment 25 is delimited by a drawer 27, frontally open, which is inserted, preferably in an extractable manner, in the front opening 26 of the containment structure 2, and preferably comprises a base wall 28, substantially horizontal, on which the container 24 is intended to be abutted.

Preferably, the base wall 28 of the drawer 27 is at the bottom provided with a tilted engagement foot 28' (extended downward from the front panel 6 towards the interior of the containment structure 4), which rests on a support slide 87 of the containment structure 4 (also extended downward from the front panel 6 towards the interior of the containment structure 4), in a manner such that the drawer 27 does not slide outside the front opening 26 of the front panel 6, in particular following horizontal tractions exerted via friction on the drawer 27 by the hand of the operator, when the latter extracts the container 24 from the dispensing compartment 25.

The drawer 27 is also provided at the top with an inlet hole 29, aligned with the exit aperture 22 of the tub 11, and through which the cream dispensed from the tub 11 enters into the drawer 27 itself in order to fall inside the container 24.

The equipment 1 also comprises a mixing body 30, inserted inside the compartment 14 of the tub 11 and rotatable around a rotation axis Y parallel to the extension axis X of the tub 11 and preferably aligned with such extension axis X.

Figure 6:
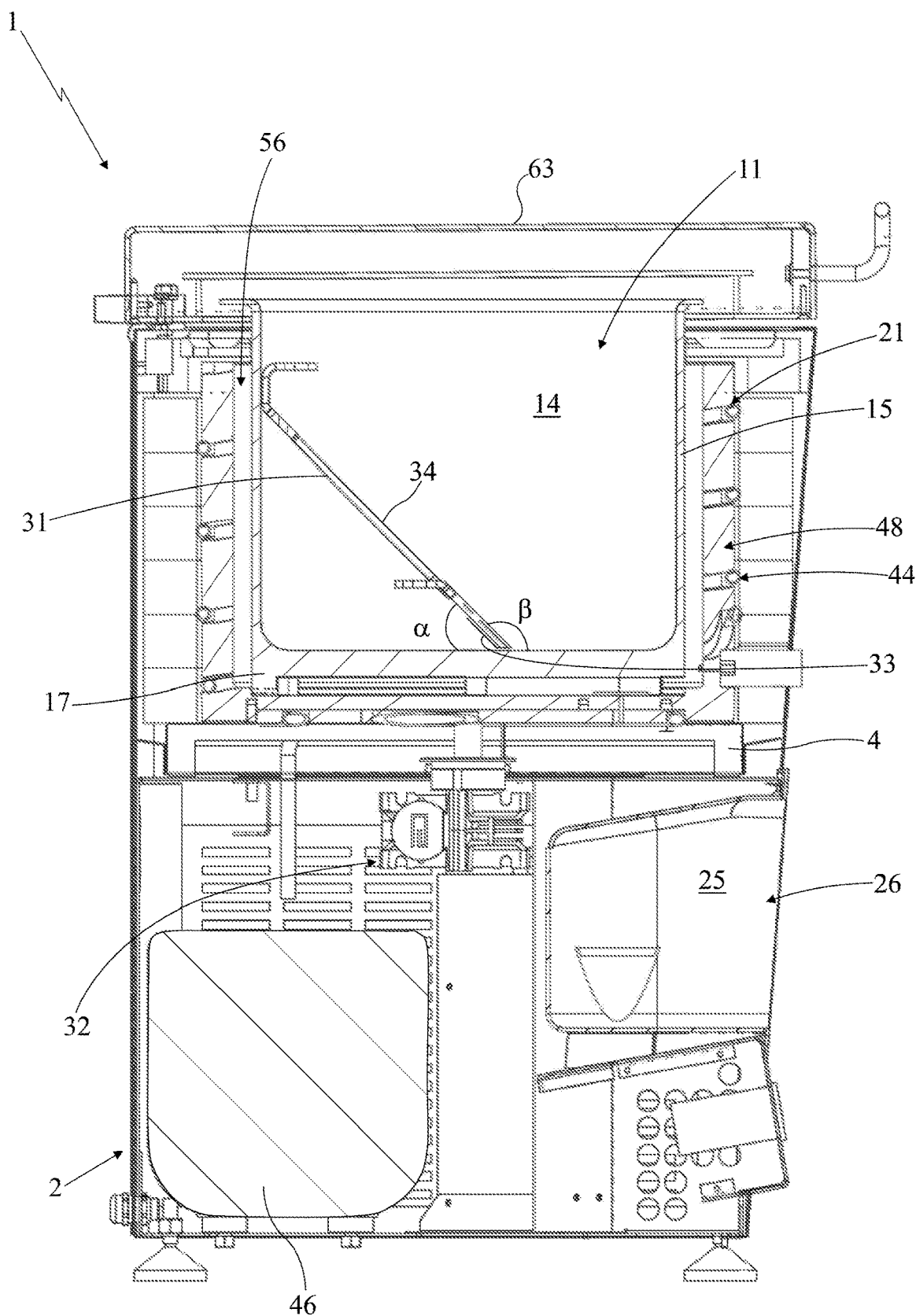
FIG. 6 illustrates a section view of the equipment illustrated in FIG. 3 along the line VI-VI of FIG. 3 itself.

With reference to the embodiment of FIGS. 5 and 6, the mixing body 30 is provided with a thrust surface 31 which faces towards the bottom wall 17 of the tub 11 and is tilted with respect to such bottom wall 17 by a first angle $\alpha$ less than 90 degrees, advantageously comprised between about 20 and 70 degrees and preferably comprised between about 30 and 60 degrees and in particular equal to about 45 degrees.

Moving means 32 are provided which are mechanically connected to the aforesaid mixing body 30 and operable, when the obturator is in the open position, in order to make the mixing body 30 rotate in a first direction of rotation R1, in which the thrust surface 31 is suitable to push the cream downward such to make it descend outside the compartment 14 of the tub 11 through the exit aperture 22 of the bottom wall 17 of the tub 11 itself.

In particular, when the mixing body 30 is operated to rotate in the aforesaid first direction of rotation R1, the thrust surface 31 advances (along a trajectory extended around the rotation axis Y) with orientation direction having at least one component in accordance with the first direction of rotation R1 itself.

The mixing body 30 of the equipment 1 according to the present invention in this manner allows dispensing, through the exit aperture 22 of the bottom wall 17 of the tub 11, food creams for dessert products having high viscosity, which would not be able to be dispensed with suitable flow rate via simple gravity, simultaneously ensuring the correct maintenance of the cream, since at the exit aperture 22 made in the bottom wall 17 no significant amount of cream remains outside the action of the mixing body 30.

Advantageously, the thrust surface 31 of the mixing body 30 is delimited at the bottom by a lower edge 33 arranged preferably parallel to the inner face of the bottom wall 17 of the tub 11.

Advantageously, in accordance with the preferred embodiment illustrated in the enclosed figures, the lower edge 33 of the thrust surface 31 of the mixing body 30 grazes the inner face of the bottom wall 17 of the tub 11, in a manner such that, when the mixing body 30 is moved to rotate in the first direction of rotation R1, the thrust surface 31 substantially removes all the cream present on the inner face of the bottom wall 17, moving such cream towards the exit aperture 22 at which the cream is thrust downward in order to exit from the compartment 14 of the tub 11.

In this manner, in particular, one prevents part of the cream from remaining deposited on the bottom wall 17 of the tub 11, consequently minimizing waste.

In particular, with the term "grazes" it is intended that the lower edge 33 of the thrust surface 31 of the mixing body 30 is substantially in contact with the inner face of the bottom wall 17 of the tub 11, i.e. it is arranged at a distance from the inner face of the bottom wall 17 up to about 1 mm.

In accordance with a different non-illustrated embodiment, the lower edge 33 of the thrust surface 31 of the mixing body 30 is arranged at a distance from the inner face of the bottom wall 17 of the tub 11 comprised between about 2 and 10 mm.

Advantageously, the mixing body 30 of the equipment 1 is provided with an upper surface 34 facing towards the access aperture 20 of the tub 11 and tilted, with respect to the bottom wall 17 of the tub 11 itself, by a second angle $\beta$ greater than 90 degrees, preferably comprised between about 120 and 150 degrees and in particular equal to about 135 degrees.

When the obturator 23 of the equipment is in the closed position, the moving means 32 are operable in order to make the mixing body 30 rotate in a second direction of rotation R2 (opposite the aforesaid first direction of rotation R1) in which the upper surface 34 of the mixing body 30 is suitable to push upward the portion of cream arranged in front of the upper surface 34 itself, so as to move upward the cream part arranged closer to the bottom in the tub 11, and move downward the cream part arranged closer to the top—in order to mix the entire cream contained in the tub 11 itself.

In particular, when the mixing body 30 is operated to rotate in the aforesaid second direction of rotation R2, the upper surface 34 advances (along a trajectory extended around the rotation axis Y) with orientation direction having at least one component in accordance with the second direction of rotation R2 itself.

Preferably, in accordance with the particular embodiment illustrated in the enclosed figures, the mixing body 30 of the equipment 1 comprises a central hub 35, rotatably constrained to the tub 11 around the rotation axis Y; from such hub 35, at least one shaped blade 36 is projectingly extended, and preferably, in accordance with the particular embodiment illustrated in the enclosed figures, at least two shaped blades 36 are projectingly extended therefrom. Each of such shaped blades 36 is provided with the aforesaid thrust surface 31 and the upper surface 34, preferably directed in opposite direction with respect to each other.

Advantageously, the mixing body 30 is provided, preferably at its shaped blades 36, with a side edge 37 which grazes the inner face of the side wall 15 of the tub 11, in a manner such to ensure the complete mixing of the cream contained in the compartment 14 of the tub 11 itself, and to prevent cream discard from remaining, which adheres to the inner face of the side wall 15 itself.

Advantageously, in accordance with the embodiment illustrated in the enclosed figures, the tub 11 has substantially cylindrical form, with the side wall 15 substantially parallel to the extension axis X and with the bottom wall arranged orthogonally to the side wall 15 itself.

Preferably, the inner face of the bottom wall 17 of the tub is connected to the inner face of the side wall 15 by means of rounded connectors 38 thereof, in order to facilitate the washing of the tub 11 itself.

In accordance with the embodiment illustrated in the enclosed figures, the exit aperture 22 of the tub 11 is made at a flat portion of the inner face of the bottom wall 17 of the tub 11 itself.

In accordance with a different non-illustrated embodiment, the exit aperture 22 of the tub 11 is made at the rounded connector 38 of the inner face of the bottom wall 17 of the tub 11 itself.

In accordance with the embodiment illustrated in FIGS. 4 and 5, the moving means 32 adapted to rotate the mixing body 30 comprise gear motors 39 (i.e., in accordance with a different embodiment, an electric motor of "step" type) preferably of brushless type, preferably housed inside the housing seat 10 of the containment structure 2 and provided with an output shaft 40 aligned with the rotation axis Y of the mixing body 30. The output shaft 40 of the gear motor 39 passes through a passage hole 41 of the bottom wall 17 of the tub 11 and enters, with an upper portion 40' thereof, inside the compartment 14 of the tub 11 itself; the mixing body 30 is fixed to such upper portion 40'.

More in detail, preferably, with reference to the FIG. 5, the tub 11 comprises a central rod 42, around which the central hub 35 of the mixing body 30 is rotatably engaged, and internally provided with a channel 42' aligned with the passage hole 41 of the bottom part 17 and traversed by the output shaft 40 of the gear motor 39.

In particular, the upper portion 40' of the output shaft 40 is provided with an annular shoulder on which central hub 35 of the mixing body 30 rests in abutment; from such annular shoulder, a shaped projection is extended (e.g. with polygonal section) and engaged in a form relationship in a counter-shaped hole of the central hub 35 in order to transfer the drive torque from the output shaft 40 to the mixing body 30. In addition, a retention screw 46 is provided, screwed to the upper portion 40' of the output shaft 40 and at the top acting in abutment against the central hub 35 in order to prevent the accidental unthreading of the mixing body 30.

Figure 9:
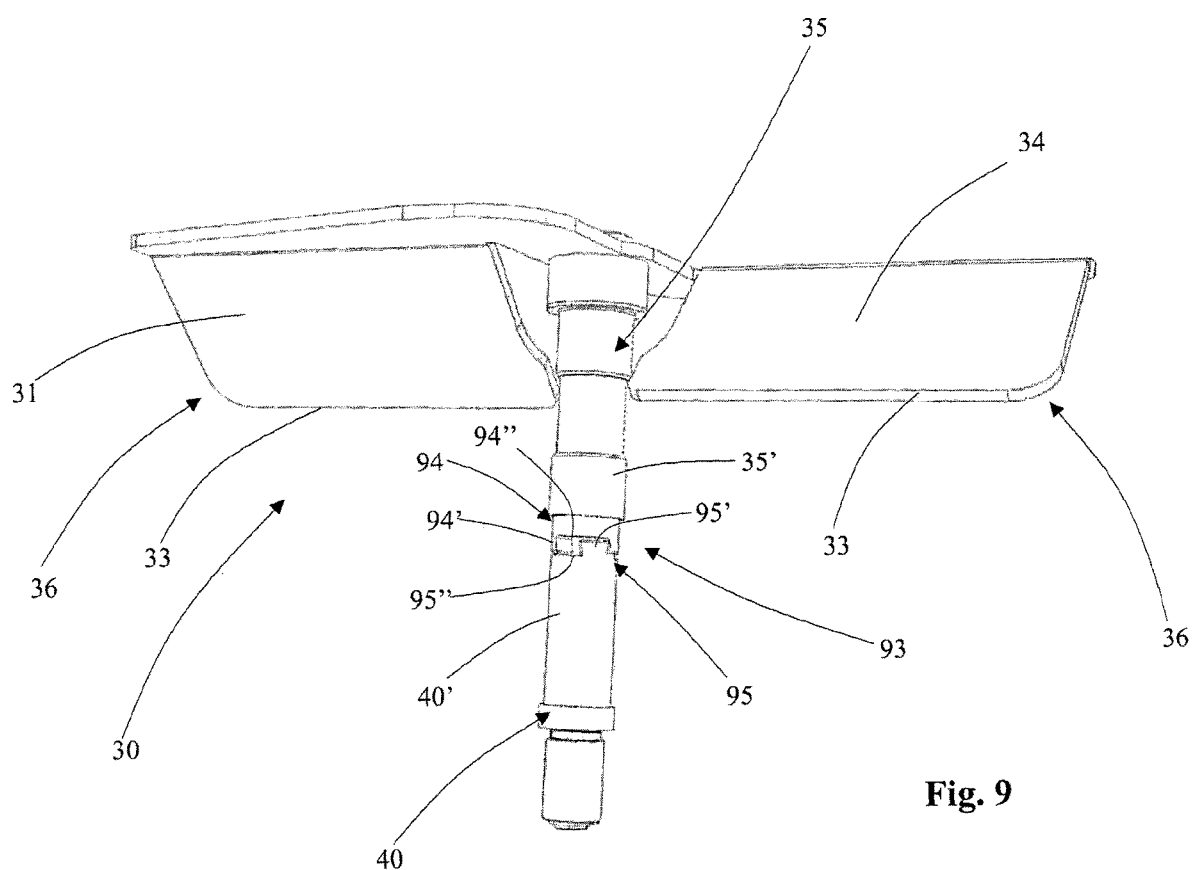
FIGS. 9 and 10 respectively illustrate a perspective view and a top plan view of the mixing body in accordance with an embodiment variant of the equipment, object of the present invention.
Figure 10:
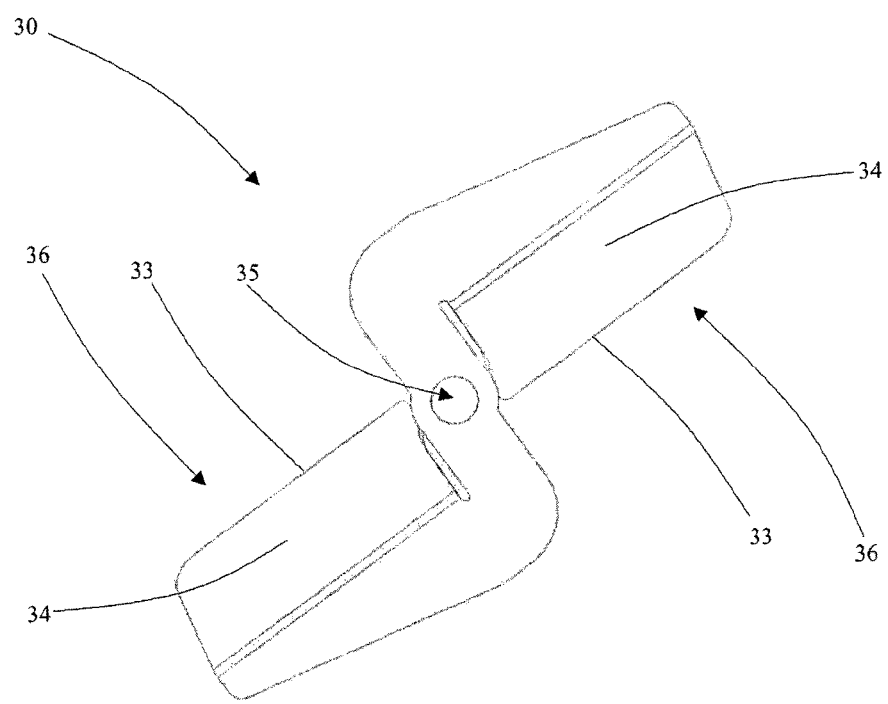

Advantageously, in accordance with an embodiment variant of the present invention illustrated in FIGS. 9 and 10, the shaped blades 36 of the mixing body 30 lack the aforesaid side edges and in particular are each mainly extended at the respective thrust surface 31 and upper surface 34. In particular, in accordance with such embodiment variant, the central hub 35 is rotatably inserted, possibly also sealingly, inside the passage hole 41 of the bottom wall 17 of the tub 11 and is fixed to the output shaft 40 of the moving means 32, such output shaft 40 being arranged completely outside the tub 11.

Preferably, the central hub 35 is provided with a lower end 35' removably fixed to the upper portion 40' of the output shaft 40 by means of fit coupling means 93.

Advantageously, such coupling means 93 comprise a first shaped head 94 integral with the lower end 35' of the central hub 35, and a second shaped head 95 integral with the upper portion 40' of the output shaft 40 and coupled to the aforesaid first shaped head 94. In particular, each shaped head 94, 95 is provided with corresponding projecting tabs 94', 95' and with corresponding shaped seats 94", 95", in which the projecting tabs 95', 94' of the other shaped head 95, 94 are inserted.

Preferably, the projecting tabs 94', 95' of each shaped head 94, 95 are arranged around the rotation axis Y of the mixing body 30 alternated with the corresponding shaped seats 94", 95".

Preferably, the projecting tabs 94', 95' of each shaped head 94, 95 are dovetail shaped so as to define, in the corresponding shaped seats 94", 95", corresponding undercuts in which the projecting tabs 95', 94' of the other shaped head 95, 94 are susceptible of being engaged.

In particular, each shaped seat 94", 95" of each shaped head 94, 95 is provided with an access aperture of size such to allow the entrance of the projecting tab 95', 94' of the other shaped head 95, 94 by means of a movement of the central hub 35 parallel to the rotation axis Y. Once the projecting tab 94', 95' is inserted in the shaped seat 95", 94", it is possible to engage such projecting tab 94', 95' with the undercut of the shaped seat 95", 94" by means of a movement of the central hub 35 around the rotation axis Y.

Advantageously, the tub 11 is made of thermally conductive material, preferably of metal material, such as in particular aluminum.

The cooling means 21 of the equipment 1 are arranged around the outer surface 12 of the tub 11 and are thermally connected to such outer surface in order to absorb, through the walls 15, 17 of the tub 11, heat from the cream contained in the compartment 14 of the tub 11 itself, so as to maintain the cream at the temperature suitable for the maintenance thereof.

In particular, the cooling means 21 comprise a cooling circuit through which a cooling fluid flows that is susceptible of transferring cooling energy to the cream (i.e. absorbing heat from the cream itself) through the walls 15, 17 of the tub 11.

More in detail, the cooling means 21 comprise an evaporator 44, advantageously connected to the aforesaid cooling circuit, and provided with a duct 45 which is extended around the side wall 15 (and preferably also below the bottom wall 17) of the tub 11 and is traversed by the cooling fluid which, by evaporating, absorbs heat and thus decreases the temperature at the tub 11 itself.

Figure 3:
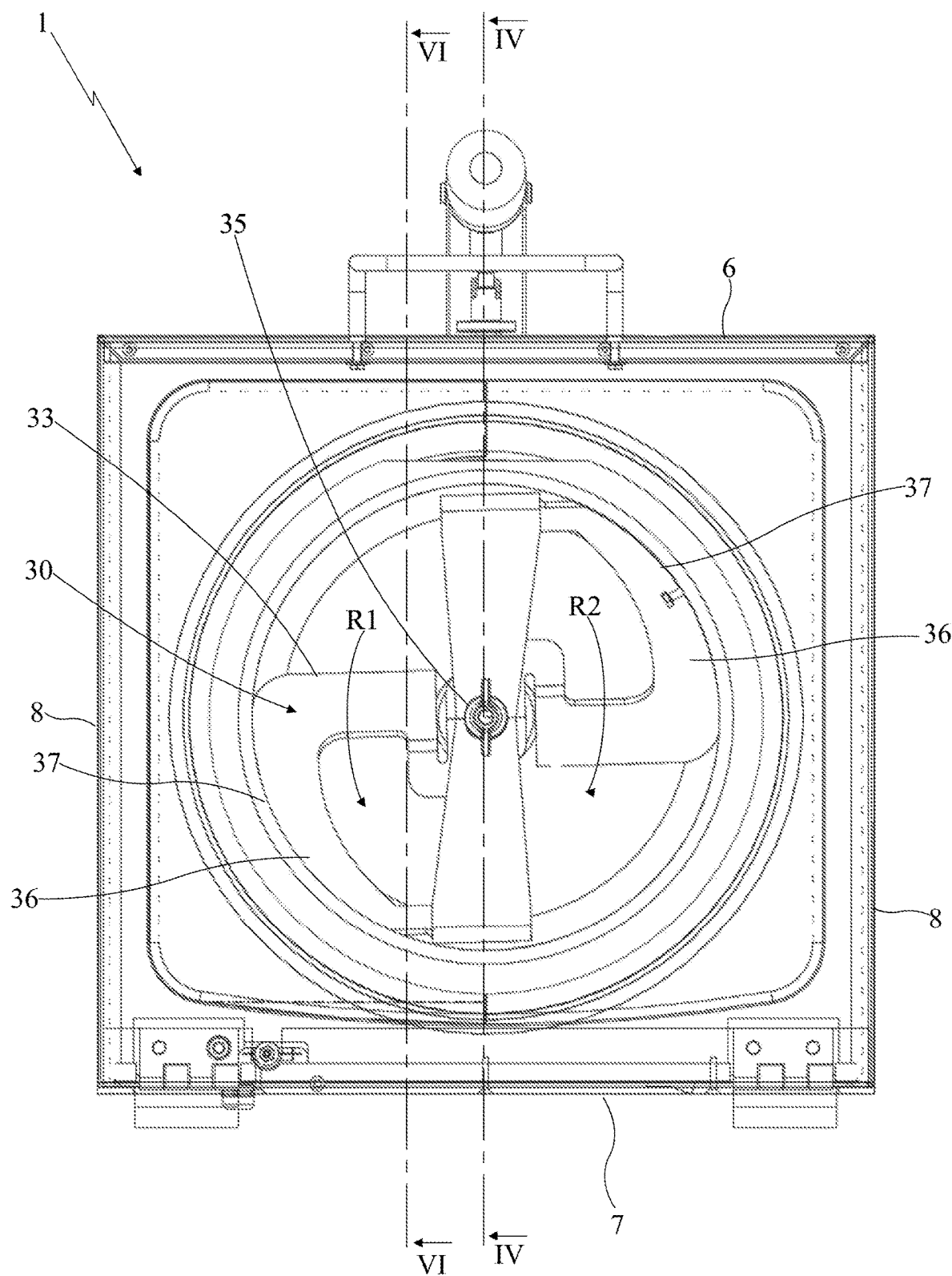
FIG. 3 illustrates a top plan view of the equipment, object of the present invention.

Preferably, with reference to the embodiment illustrated in FIGS. 2 and 3, the cooling circuit comprises a compressor 46, arranged advantageously inside the lower housing seat 10 of the containment structure 2, and connected to the evaporator 44 in order to receive the cooling fluid in gas form and compress it.

The cooling circuit is also provided with a condenser 47, advantageously arranged inside the housing seat 10 of the containment structure 2, and connected to the compressor 46 in order to receive the compressed cooling fluid and to condense it at high pressure, such that the cooling fluid transfers heat to the outside. The condenser 47 is connected to an expansion means, e.g. a capillary tube (not shown), adapted to limit the pressure of the cooling fluid and which is in turn connected to the evaporator 44 in order to resend to the latter the cooling fluid itself.

Advantageously, the equipment 1 comprises a control unit (not illustrated in the enclosed figures), in particular provided with a circuit board, which is connected to a temperature sensor (not shown) operatively associated with the tub 11 in order to detect the temperature of the cream, and is also connected to the cooling means 21 in order to command the operation thereof based on the measurements detected by the temperature sensor.

More in detail, preferably, the control unit is adapted to enable or disable the operation of the cooling means 21 when the temperature of the cream (detected by the temperature sensor) is respectively greater or lower than a specific approximate threshold value of the temperature at which it is desired to maintain the cream.

In operation, when the temperature sensor detects a temperature value greater than the aforesaid threshold value, it sends a first signal to the control unit which consequently commands the actuation of the compressor 46 of the cooling means 21, in a manner so as to actuate the circulation of the cooling fluid through the cooling circuit and in particular through the evaporator 44 associated with the tub 11.

When the temperature sensor detects a temperature value lower than the aforesaid threshold value, it sends a second signal to the control unit which consequently commands the turning off of the compressor 46 in order to prevent the temperature of the cream from falling to an overly low value, not suitable for maintaining the organoleptic properties of the cream itself.

In accordance with the embodiment illustrated in FIGS. 4 and 5, the duct 45 of the evaporator 44 is extended with helical progression around the side wall 15 of the tub 11 substantially between the upper end 18 and the lower end 16 of the side wall 15 itself and continues, preferably with sinusoidal progression, below the bottom wall 17.

Advantageously, the cooling means 21 comprise an inertial accumulator of cooling energy 48, which is in thermal contact with the evaporator 44 in order to absorb the cooling energy produced by the latter, and is extended around the outer surface 12 of the tub 11 in order to transfer the cooling energy to the cream contained inside the tub 11 itself through the walls 15, 17 of the latter.

Preferably, the aforesaid inertial accumulator 48 comprises a mass body 49 of thermally conductive material, which is contact with the duct 45 of the evaporator 44 and is provided with an internal seat in which the tub 11 is at least partially housed.

Preferably, the aforesaid mass body 49, made of metal material, in particular aluminum, is arranged in the process seat 9 of the containment structure 2 and is fixed to the metal framework 4 of the latter.

In particular, the mass body 49 has substantially tubular form, with axis parallel to the extension axis X of the tub 11, and it is provided with a tubular wall 50 provided at the top with a passage opening 51, through which the tub 11 is inserted in the mass body 49, and is closed at the bottom by a lower base 52 on which the bottom wall 17 of the tub 11 itself at least partially rests. Such bottom wall 17 is preferably spaced from the lower base 52 of the mass body 49 in particular by means of one or more spacer support elements projecting from the outer face of the bottom wall 17 itself.

Advantageously, around the tubular wall 50 and the lower base 52 of the mass body 49, at least one layer of insulating material 53 is arranged, in order to prevent the cooling energy from being dissipated outside the equipment 1.

Preferably, the lower base 52 of the mass body 49 is provided with a through hole 54 aligned with the exit aperture 22 of the tub 11 and preferably aligned with the inlet hole 29 of the drawer 27, in order to allow the passage of the cream from the tub 11 to the underlying container 24 arranged in the drawer 27 itself.

In particular, the equipment 1 comprises a conveyance duct 55 inserted inside the through hole 54 of the lower base 52 of the mass body 49 and extended from such lower base 52 substantially up to the inlet hole 29 of the drawer 27, in particular passing through the insulating material layer 53 placed around the mass body 49, in order to ensure that the cream dispensed from the exit aperture 22 of the tub 11 does not dirty the insulating material layer 53, i.e. it falls inside the containment structure 2 of the equipment 1 itself.

In accordance with the particular embodiment illustrated in FIGS. 4 and 5, the duct 45 of the evaporator 44 is housed inside peripheral grooves made in the mass body 49 of the inertial accumulator 48.

In accordance with a non-illustrated embodiment, the duct 45 of the evaporator 44 is integrated in the mass of the mass body 49 of the inertial accumulator 48.

In operation, the inertial accumulator 48 receives cooling energy from the cooling fluid which traverses the duct 45 of the evaporator 44, accumulating it in the mass of the mass body 49 of the accumulator 48 itself, in a manner such to transfer the accumulated cooling energy in a spatially uniform manner to the walls 15, 17 of the tub 11, and in a uniform manner over time, in particular even when the cooling means 21 are deactivated.

Preferably, in accordance with the embodiment illustrated in the enclosed figures, the temperature sensor, adapted to detect the temperature of the cream contained in the tub 11, is associated with the inertial accumulator 48 and is in particular inserted inside a cavity 88 made in the lower base 52 of the mass body 49 of the inertial accumulator 48 itself, in order to measure the temperature of the mass body 49, in a manner such to detect an approximate value of the temperature of the cream contained in the tub 11.

Advantageously, the equipment 1 according to the present invention is provided with an air chamber 56 interposed between the cooling means 21 and the outer surface 12 of the tub 11, and adapted to dampen the temperature oscillations of the cream due to the alternation of the turning on and off phases of the cooling circuit.

In accordance with the embodiment illustrated in the enclosed figures, the air chamber 56 is made between the outer surface 12 of the tub 11 and the inertial accumulator 48, and in particular between the side wall 15 of the tub 11 and the tubular part 50 of the mass body 49 of the inertial accumulator 48, and between the bottom wall 17 of the tub 11 and the lower base 52 of the mass body 49.

In accordance with a different embodiment not illustrated in the enclosed figures, the lower base 52 of the mass body 49 is in contact with the bottom wall 17 of the tub 11 (in particular possibly also without the presence of spacer support elements), with the air chamber 56 which is substantially obtained only between the side wall 15 of the tub 11 and the tubular part 50 of the mass body 49.

Figure 7:
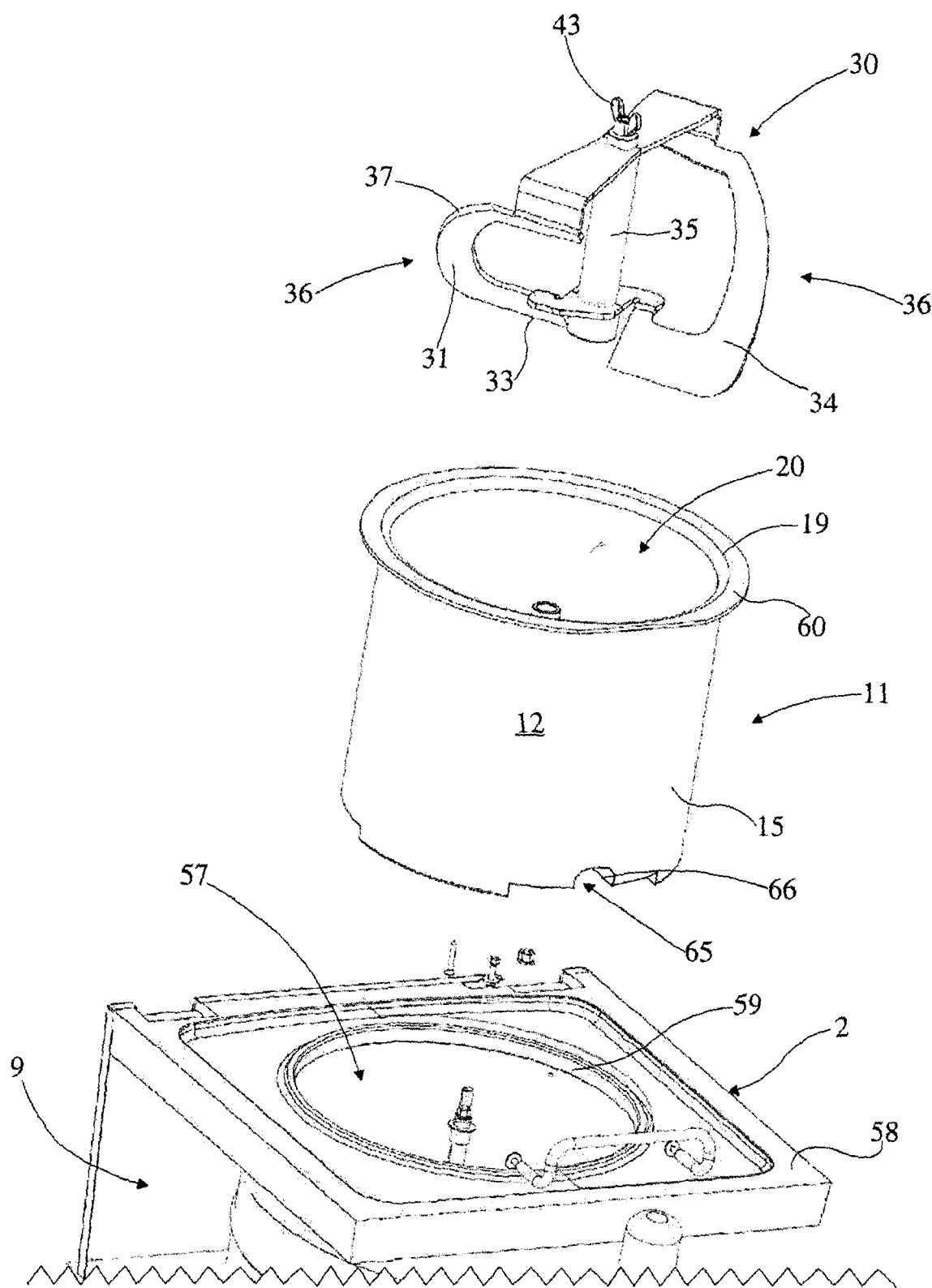
FIG. 7 illustrates a partially exploded view relative to the tub and to the mixing body of the equipment, object of the present invention.

Advantageously, with reference to the FIG. 7, the process seat 9 of the containment structure 2 of the equipment 1 is provided with an upper opening 57 through which the tub 11 is inserted, in a removable manner, inside the process seat 9 itself.

In this manner, the tub 11 can be extracted from the process seat 9 and re-insertable inside the latter by sliding the tub 11, through the upper opening 57 of the process seat 9, along a direction parallel to the extension axis X of the tub 11 itself.

In particular, with reference to the embodiment illustrated in the enclosed figures, the containment structure 2 of the equipment 1 comprises an upper panel 58, preferably horizontal, on which the aforesaid upper opening 57 is made in a through manner, which is arranged substantially aligned with the extension axis X of the tub 11.

In particular, the peripheral edge 59 of the aforesaid upper opening 57 is substantially counter-shaped with respect to the transverse profile of the outer face of the side wall 15 of the tub 11, in a manner such that when the tub 11 is inserted in the process seat 9, the side wall 15 substantially closes the upper opening 57 itself.

Advantageously, in order to extract the tub 11 from the process seat 9 of the containment structure 2, it is sufficient to remove the retention screw 43 fixed to the central hub 35 of the mixing body 30, unthread the latter from the central rod 42 of the tub 11 and then extract the tub 11 itself.

In particular the tub 11, once extracted from the containment structure 2 of the equipment 1, can be washed in a convenient and quick manner, by placing it in a dishwasher, for example.

Advantageously, the upper edge 19 of the side wall 15 of the tub 11 is provided with an outer flange 60 which, when the tub 11 is housed in the process seat 9 of the containment structure 2, is arranged spaced from the upper panel 58 of the containment structure 2, in particular in order to allow the operator to conveniently grasp the tub 11 during the operations of insertion and extraction of the tub 11 itself into and from the process seat 9.

Advantageously, with reference to the embodiment illustrated in FIG. 5, the equipment 1 comprises a retention pin 61 projectingly fixed on the inner face of the lower base 52 of the mass body 49 of the inertial accumulator 48, and inserted in a corresponding seat 62 made on the outer face of the bottom wall 17 of the tub 11, in order to prevent movements of the tub 11 around its extension axis X.

Preferably, the containment structure 2 of the equipment 1 comprises a closure cover 63, hinged to the upper panel 58 of the containment structure 2 itself, and actuated to be closed in order to cover the access aperture 20 of the tub 11, and to be open in order to allow inserting the cream in the tub 11, or for extracting or inserting the tub 11 from the or into the process seat 9 of the containment structure 2.

In particular, the closure cover 63, preferably made of transparent material, is provided with a double glazing 64 in order to prevent the dissipation of cooling energy from the compartment 14 of the tub 11 to outside the equipment 1.

Advantageously, the tub 11 is provided with a sliding guide 65 made in the thickness of its bottom wall 17 and in which the obturator 23 is slidably inserted, such obturator operable for opening and closing the exit aperture 22 of the bottom wall 17 itself.

In accordance with the embodiments illustrated in the enclosed figures, the bottom wall 17 of the tub 11 has substantially constant thickness and is made integrally with the side wall 15 of the tub 11 itself.

In accordance with a different embodiment not illustrated in the enclosed figures, the bottom wall 17 has one or more undercut zones and at least one zone of increased thickness in which the sliding guide 65 is made. Advantageously, the lower base 52 of the mass body 49 is counter-shaped with respect to the outer surface of the bottom wall 17 of the tub 11, given that in particular the lower base 52 is provided with projecting portions, preferably inserted to size in the undercut zones of the bottom wall 17, in order to ensure the at least partial contact between the bottom wall 17 of the tub 11 and the lower base 52 of the mass body 49.

In accordance with a further different embodiment, not illustrated in the enclosed figures, the bottom wall 17 is provided at the bottom with at least one thickening plate integral with the tub 11 by means of screws, the sliding guide 65 being made in this plate.

Figure 8:
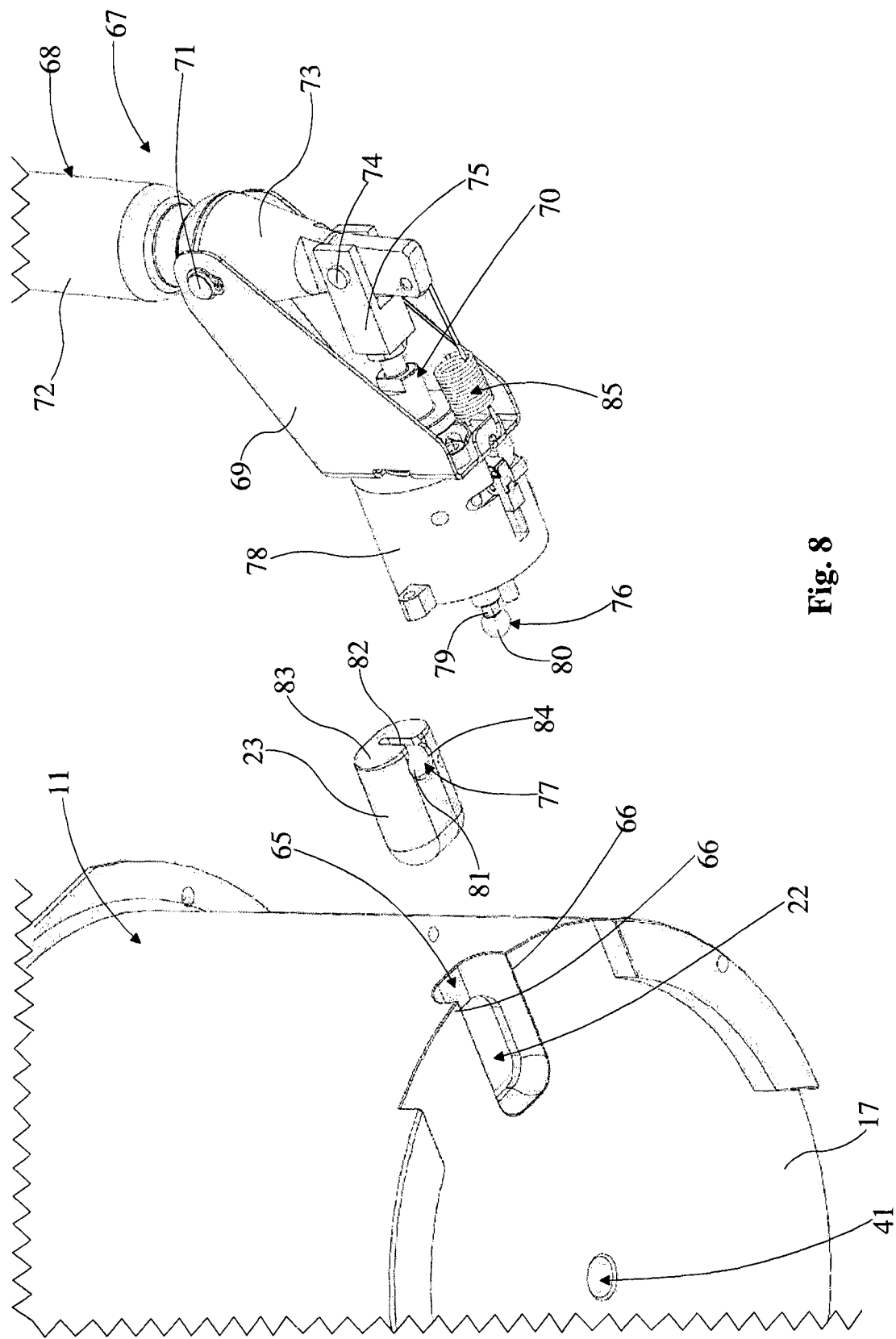
FIG. 8 illustrates a partially exploded view of a detail of the present equipment, relative to the obturator of the exit aperture of the tub and to the actuating means for the obturator itself.

More in detail, with reference to the embodiment illustrated in FIGS. 5 and 8, the aforesaid sliding guide 65 is extended according to a sliding direction W substantially orthogonal to the extension axis X of the tub 11, intercepting the exit aperture 22 of the bottom wall 17 of the tub 11 itself.

In this manner, advantageously, when the obturator 23 is in the closed position, it enters into the exit aperture 22, occupying it along its extension in the thickness of the bottom wall 17, in particular facing the inner face of the bottom wall 17 itself. Hence, the obturator 23 in the closed position prevents the cream from stagnating inside the exit aperture 22, ensuring that substantially all of the cream remains in the compartment 14 of the tub 11, in which the cream is subjected to being mixed by the mixing body 30—hence preventing any part of the cream from being subjected to degradation.

Preferably, the sliding guide 65 of the tub 11 is provided with at least one lower shoulder 66, on which the obturator 23 is slidably abutted in a manner such that, when the tub 11 is extracted from the process seat 9 of the containment structure 2, the obturator 23 remains inserted inside the sliding guide 65 itself, and can be washed together with the tub 11 without having to access inside the containment structure 2 of the equipment 1.

Preferably, the sliding guide 65 of the tub 11 is internally shaped with rounded connector surface, in order to facilitate the washing of the tub 11 itself.

Advantageously, the equipment 1 comprises an actuating device 67 fixed to the containment structure 2 and mechanically connected to the obturator 23 in order to command the latter to move between the closed position and the open position.

In particular, with reference to the embodiment illustrated in FIGS. 3 and 8, the actuating device comprises a lever 68 constrained, preferably by means of a support bracket 69, to the containment structure 2 of the equipment 1, and connected to a movement body 70 substantially slidable along the sliding direction W and in turn connected to the obturator 23 in order to actuate the movement thereof.

More in detail, advantageously, the lever 68 of the actuating device 67 is hinged to the support bracket 69 by means of a first pin 71 (preferably horizontal) which is interposed between a grip portion 72 of the lever 68 (susceptible of being grasped by the operator in order to move the lever 68) and an opposite connection portion 73 hinged to the movement body 70 by means of a second pin 74 parallel to the aforesaid first pin 71.

The movement body 70 of the actuating device 67 is preferably of rod-like form and is extended between a connection portion 75 thereof, constrained to the lever 68, and an opposite engagement portion 76, with shaped form, inserted so as to be retained in an engagement seat 77 of the obturator 23, in a manner such to allow the movement body 70 to move the obturator 23 in the sliding guide 65.

Preferably, the movement body 70 is slidably inserted inside an annular bushing 78 fixed to the front panel 6 of the containment structure 2.

In particular, the movement body 70 is slidable inside a ball joint 89 rotatably constrained within the aforesaid annular bushing 78, in a manner such to allow the movement body 70 to complete relative oscillations determined by the movement of the connection portion 73 of the lever 68 (to which the connection portion 78 of the movement element 70 is constrained) when the lever 68 is actuated to rotate around the first pin 71 thereof.

In accordance with a different embodiment of the present invention, not illustrated in the enclosed figures, the moving device 67 comprises (in substitution of the lever 68) an electromechanical actuator connected to the movement body 70 and operable, for example by means of an actuation button, to make the movement body 70 itself slide in order to move the obturator 23 between the open position and the closed position.

Advantageously, the engagement portion 76 of the movement body 70 comprises a projecting stem 79 bearing, fixed thereto, an enlarged head 80 inserted in the engagement seat 77 of the obturator 23.

The engagement seat 77 is provided with a cavity 81, in which the enlarged head 80 of the engagement portion 76 of the movement body 70 is engaged, and with a thinned channel 82, in which the projecting stem 79 of the engagement portion 76 is inserted and which leads to a rear face 83 of the obturator 23 facing towards the movement body 70.

Advantageously, the engagement seat 77 of the obturator 23 is at the bottom provided with an insertion opening 84 through which the engagement portion 76 of the movement body 70 is susceptible of being inserted in the engagement seat 77, by means of in particular a relative movement between the obturator 23 and the movement body 70, substantially orthogonal to the sliding direction W.

In this manner, when the tub 11 is extracted from the process seat 9 of the containment structure 2, the obturator 23 remains constrained inside the sliding guide 65 of the bottom wall 17 and the engagement portion 76 of the movement body 70 is separated, in particular by unthreading such engagement portion 76 from the engagement seat 77 of the obturator 23 itself through the insertion opening 84. Then, the obturator 23 can be removed from the sliding guide 65 in order to be suitably cleaned.

When it is necessary to reposition the tub 11 in the equipment 1, the obturator 23 is reinserted in the sliding guide 65 of the bottom wall 17 of the tub 11 itself, and then the latter is inserted in the process seat 9 of the containment structure 2, until the engagement portion 76 of the movement body 70 enters in the engagement seat 77 of the obturator 23 through the insertion opening 84 of the engagement seat 77 itself.

In operation, in order to dispense the cream from the equipment 1, the lever 68 of the actuating device 67 is actuated, by acting on its grip portion 72, to rotate in a first rotation sense S1 (counter-clockwise in the embodiment of FIG. 5) in a manner such to pull the movement body 70 to slide towards the equipment 1 exterior, in turn pulling the obturator 23 to slide in the sliding guide 65 until the exit aperture 22 of the bottom wall 17 of the tub 11 is at least partially freed.

Advantageously, the actuating device 67 comprises a return spring 85, e.g. helical, adapted to move the lever 68 in order to bring the obturator 23 back into the closed position when the lever 68 is released by the operator.

More in detail, the return spring 85 is provided with a first end constrained to the containment structure 2, preferably by means of the support bracket 69, and with an opposite second end constrained to the connection portion 73 of the lever 68. The return spring 85 is loaded in a manner such to pull the lever 68 to rotate in a second rotation sense S2 (clockwise in the example of FIG. 5) in order to move the movement body 70 to slide towards the interior of the equipment 1, pushing the obturator 23 to slide in the sliding guide 65 until it occupies the exit aperture 22 of the bottom wall 17 of the tub 11.

In this manner, when the operator releases the lever 68 of the actuating device 67, the return spring 85 brings the lever 68 to rotate in the second rotation sense S2, automatically bringing the obturator 23 into the closed position.

Advantageously, the equipment 1 comprises a position detector 86 operatively associated with the actuating device 67 in order to detect the position in which the obturator 23 has been commanded (open position or closed position).

Such position detector (in particular obtained with a switch) is connected to the control unit of the equipment 1, in order to send to the latter a first switching signal when the actuating device 67 brings the obturator 23 into the open position. The control unit, following the reception of the aforesaid first switching signal, commands the gear motor 39 in order to make the mixing body 30 rotate in the aforesaid first direction of rotation R1, in a manner such to push the cream to exit from the tub 11 through the exit aperture 22 of the bottom wall 17 of the tub 11 itself, in accordance with that described above.

Advantageously, when the actuating device 67 brings the obturator 23 into the closed position, the position detector is adapted to send a second switching signal to the control unit, which consequently commands the gear motor 39 to make the mixing body 30 rotate in the aforesaid second direction of rotation R2, in order to mix the cream contained in the compartment 14 of the tub 11 so to ensure the correct maintenance of the cream itself.

In particular, when the obturator 23 is in the closed position, the control unit is programmed in order to command the gear motor 39 to make the mixing body 30 rotate according to specific operating intervals, in which the mixing body 30 is operated to rotate in the second direction of rotation R2, alternated with non-operating intervals, in which the rotation of the mixing body 30 is stopped.

In particular, the duration of the aforesaid intervals and the rotation speed of the mixing body 30 are determined in a manner such to maintain the correct characteristics of reticular stability and viscosity of the cream contained in the compartment 14 of the tub 11 of the equipment 1, as described in detail hereinbelow.

Also forming an object of the present invention is a process for processing food creams; such process is in particular obtained by means of the equipment 1 of the above-described type.

Hereinbelow, for the sake of description simplicity, reference will be made to the same nomenclature introduced up to now, even if it must be intended that the present process can also be obtained with equipment not provided with all the above-considered characteristics.

The present process is intended to be advantageously actuated in order to obtain the desired organoleptic properties of food cream that was previously frozen and preserved at temperatures lower than or equal to −18° C.

More in detail, preferably, the production of the aforesaid cream (obtained for example in a laboratory for producing food products) comprises a step of metering the ingredients, such as mascarpone, cream, egg and sugar, obtaining a mixture comprising, in general from a chemical-physical standpoint, a fatty phase and an aqueous phase, and at least one emulsifying agent is added to such mixture.

A whipping step is also provided, in which the ingredients of the mixture are homogenized, forming a cream in mixture form that is at least partially emulsified and at least partially whipped (with the term "whipped", it being intended the incorporation of air in the cream).

Subsequently, a step is provided for metering the cream in containers, such as jars or molds, and then a step of freezing by means of an operation of temperature lowering in which the cream is brought to a temperature lower than or equal to −18° C. In particular in the aforesaid freezing step, the cream is subjected to a low formation of micro-crystals, which have a negligible impact on the cream, and in particular on the incorporation of air obtained during the aforesaid step of whipping the cream itself.

Advantageously, the frozen cream is transported from the place of production to the place of sale by means of cold logistics systems of the type known to the man skilled in the art.

The process for processing food creams, according to the present invention, preferably comprises a step of unfreezing and maturation of the cream, in which the latter is maintained inside a refrigerator at temperatures advantageously comprised between −5° C. and +10° C., and preferably between about 0° C. and +4° C., for a period comprised between about 3 and 12 hours.

Such step of unfreezing and maturation involves the activation, i.e. the restarting of the activity, of the emulsifying agent contained in the cream, which causes the formation of a molecular lattice which gives the cream itself a so-called "gel-like" structure, in the known jargon of the food sector. In particular, the emulsifying agent "electrically protects" the drops of the aqueous phase of the cream, which thus remain uniformly and stably dispersed in the gaseous phase of the cream itself.

According to the present invention, the present process comprises, advantageously after the aforesaid unfreezing and maturation step, a step of introducing the cream inside the tub 11 of the equipment 1; in this step, preferably, the operator opens the closure cover 63 of the equipment 1 and pours the cream into the tub 11 through the access aperture 20 of the latter, subsequently closing the closure cover 63.

In addition, the present process comprises a step of maintaining the cream at a temperature comprised between about −5° C. and +4° C., and preferably between about −3° C. and +2° C., by means of the actuation of the aforesaid cooling means 21 operatively associated with the tub 11.

More in detail, such maintenance step comprises, during a first operating interval, a stage of dynamic maintenance of the cream, in which the latter is mixed by means of the mixing body 30 of the equipment 1 operated to rotate around the rotation axis Y thereof.

In particular, during the aforesaid stage of dynamic maintenance, the rotating mixing body 30 exerts shear stresses in the cream which cause the partial destruction of the molecular lattices of the "gel-like" structure of the cream, leading to an increase of the fluidity of the cream itself.

Advantageously, during the stage of dynamic maintenance, the mixing body 30 is operated to rotate at a first rotation speed not greater than about 10 revolutions per minute, and preferably equal to about 2 revolutions per minute.

Preferably, during the stage of dynamic maintenance, the mixing body 30 is operated to rotate in the aforesaid second direction of rotation R2, in which the upper surface 34 of the mixing body 30 pushes upward the portion of cream arranged in front of it, so as to move upward the cream part arranged closer to the bottom in the tub 11, and move downward the cream part arranged closer to the top—in order to facilitate the mixing of the entire cream contained in the tub 11 itself.

The maintenance step of the present process also comprises, during a second operating interval, a stage of static maintenance of the cream, in which the rotation of the maintenance body 30 is stopped.

In particular, in such stage of static maintenance in which the cream is maintained at rest, the reticular structure of the cream, in the absence of mixing, tends to reform, bringing the cream itself back towards a "gel-like" state, with consequent decrease of the fluidity of the cream itself.

In the present description, the terms "first" and "second" operating interval do not necessarily involve a sequential order of execution of the respective maintenance stages; of course, the stage of static maintenance could even be executed before the stage of dynamic maintenance without departing from the protective scope of the present patent.

According to the present invention, the ratio between the second operating interval of the stage of static maintenance and the first operating interval of the stage of dynamic maintenance has a value greater than or equal to about 1, preferably greater than or equal to about 2, in particular comprised between about 5 and 100. Such values of the aforesaid ratio allow ensuring the desired degree of structure of the cream, and hence in particular its fluidity, so as to obtain the desired organoleptic properties of the cream itself when it is dispensed in order to be served.

Advantageously, the stage of dynamic maintenance and the stage of static maintenance are cyclically repeated, one after the other, with each cycle comprising an aforesaid first operating interval of the stage of dynamic maintenance and an aforesaid second operating interval of the stage of static maintenance, in a manner such to maintain the degree of fluidity of the cream within a specific optimal fluidity range, suitable for the consumption of the cream itself.

More in detail, advantageously, in accordance with a particular embodiment of the invention, each cycle has a duration comprised between about forty-five minutes and three hours, and preferably is about an hour and a half.

In particular, for example in the case of a cycle of about an hour and a half, the first operating interval of the stage of dynamic maintenance has a duration of not greater than about 45 minutes.

Preferably, the first operating interval of the stage of dynamic maintenance has a duration of about 2-3 minutes.

Advantageously, the stages of dynamic and static maintenance are cyclically repeated until there is no longer cream inside the tub 11, or until the introduction of further cream in the tub 11, even before the cream already present in the tub 11 has completely finished.

In the present description, the aforesaid ratio between the second operating interval (of the stage of static maintenance) and the first operating interval (of the stage of dynamic maintenance) must be intended as the ratio between the second and the first interval of each cycle, i.e. as the overall ratio between the sum of the second operating intervals of all the cycles and the sum of the first operating intervals of all the cycles.

Preferably, the cream processed according to the present process has a substantially thixotropic behavior, in particular being characterized by a curve in the plane of the rheogram, representative of the thixotropic function, that has a progression during the stage of dynamic maintenance of different form with respect to the progression during the stage of static maintenance.

Advantageously, the cyclic repetition of the stages of dynamic and static maintenance determine a variation of the fluidity of the cream having thixotropic behavior according to a multiple hysteresis progression, maintaining (during the maintenance step) the fluidity of the cream inside the aforesaid optimal range.

The process according to the present invention, comprises a step of dispensing the cream from the tub 11 through the exit aperture 22 of the latter.

In particular, the dispensing step is commanded by an operator acting on the actuating device 67 of the equipment 1, described in detail above, in order to command the movement of the obturator 23 from the closed position to the open position.

Advantageously, in the aforesaid dispensing step, the mixing body 30 is actuated, preferably by the control unit of the equipment 1, to rotate around the rotation axis Y thereof.

In particular, in the dispensing step, the mixing body 30 is operated to rotate in its first direction of rotation R1 in which the mixing body 30 pushes, with its thrust surface 31, the cream to descend through the exit aperture 22 made in the bottom wall 17 of the tub 11.

Advantageously, in the dispensing step, the mixing body 30 rotates with a second rotation speed not less than about 6 revolutions per minute, and preferably equal to about 13 revolutions per minute or equal to about 20 revolutions per minute, in particular with the mixing body 30 provided with two shaped blades 36.

In particular, the rotation of the mixing body 30 in the dispensing step causes a mixing of the cream, in addition to that which occurs in the aforesaid stage of dynamic maintenance.

Advantageously, the stage of dynamic maintenance is repeated in alternation with the stage of static maintenance until the aforesaid dispensing step is actuated.

Preferably, once the dispensing step has terminated, there is in any case the stage of static maintenance before actuating the stage of dynamic maintenance.

In particular, when the operator commands the actuation of the dispensing step in order to meter the cream during the second operating interval of the stage of static maintenance, the latter stage is interrupted before the completion of the aforesaid second operating interval. Once the aforesaid dispensing step has terminated, the control unit of the equipment 1 once again commands the actuation of the stage of static maintenance for the entire second operating interval, before commanding the actuation of the stage of dynamic maintenance.

Advantageously, in an analogous manner, if the dispensing step is commanded during the first operating interval of the stage of dynamic maintenance, at the end of the dispensing step the control unit commands the actuation of the stage of static maintenance for the entire second operating interval and only afterward commands the repetition of the stage of dynamic maintenance.

In this manner, after the dispensing step, one prevents subjecting the cream to excessively close mixing operations, which could cause an overly high fluidity of the cream, outside the aforesaid optimal fluidity range.

In accordance with a different embodiment, at the end of the dispensing step, the control unit of the equipment 1 commands the completion of the stage of maintenance of the operating interval in which the dispensing step itself had been commanded (i.e. the completion of the stage of dynamic maintenance if the dispensing step had been commanded in the first operating interval, and the completion of the stage of static maintenance if the dispensing step had been commanded in the second operating interval).

Advantageously, in accordance with a further different embodiment, the stage of dynamic maintenance is obtained during the dispensing step itself, by means of the mixing of the cream determined by the rotation of the mixing body 30 in its first direction of rotation R1.

In particular, in accordance with the latter embodiment, the present process provides for, after the step of inserting the cream in the tub 11, the actuation of the stage of static maintenance interrupted by the successive dispensing step, which simultaneously also actuates the stage of dynamic maintenance.

Preferably, in accordance with the latter embodiment, during the dispensing step (which coincides with the stage of dynamic maintenance) the mixing body 30 of the equipment 1 is operated to rotate at a rotation speed not less than about 6 revolutions per minute.

The invention thus conceived therefore attains the aforesaid objects.

The invention claimed is:

1. The equipment for processing food creams, which comprises:
    a containment structure provided with a process seat;
    at least one tub which is at least partially housed inside said process seat and is provided with an outer surface and an inner surface which delimits a compartment designed to contain at least one food cream to be processed, said tub comprising a side wall which is extended around a substantially vertical extension axis (X) and is extended along said extension axis (X) between a lower end closed by a bottom wall, and an upper end provided with an upper edge which delimits an access aperture through which said cream is intended to be inserted in said compartment, the bottom wall of said tub being provided with at least one exit aperture through which said cream is dispensed outside said compartment;
    cooling means operatively associated with said tub in order to absorb heat from said cream;
    an obturator operatively connected to the bottom wall of said tub and movable between a closed position, in which said obturator occludes the exit aperture of said bottom wall, and an open position, in which said obturator leaves the opening of said exit aperture at least partially free to avow said cream to come out of the compartment of said tub;
    at least one mixing body, inserted inside the compartment of said tub and rotatable around a rotation axis (Y) substantially parallel to the extension axis (X) of said tub; wherein said mixing body comprises a central hub rotatable around said rotation axis (Y), and at least one shaped blade which is projectingly extended from said central hub above said bottom wall; wherein said shaped blade is provided with at least one thrust surface which faces towards the bottom wall of said tub and is tilted with respect to said bottom wall by a first angle ($\alpha$) comprised between about 20 and 70 degrees; wherein said thrust surface is provided with a lower edge parallel to an inner face of the bottom wall of said tub and arranged at a distance from the inner face of said bottom wall less than or equal to 10 mm;
    moving means mechanically connected to said mixing body and operable, with said obturator in said open position, to make said mixing body rotate in a first direction of rotation (R1) in which said thrust surface is suitable to push said cream to descend through the exit aperture of the bottom wall of said tub; wherein said exit aperture is positioned laterally spaced from the rotation axis (Y) of said mixing body.

2. The equipment according to claim 1, wherein said lower edge grazes the inner side of the bottom wall of said tub.

3. The equipment according to claim 1, wherein said mixing body is provided with an upper surface facing towards the access aperture of said tub and tilted with respect to the bottom wall of said tub by a second angle ($\beta$) greater than 90 degrees;
    said moving means being arranged, with said obturator in said closed position, to make said mixing body rotate in a second direction of rotation (R2), opposite said first direction of rotation (R1), in which said upper surface is suitable to push upward the portion of cream arranged in front of said upper surface.

4. The equipment according to claim 1, wherein said cooling means are arranged at least around the outer surface of said tub and are thermally connected to the walls of said tub in order to absorb heat from said cream contained in the compartment of said tub.

5. The equipment according to claim 4, wherein said tub is made of thermally conductive material.

6. The equipment according to claim 4, further comprising at least one air chamber interposed between said cooling means and the outer surface of said tub.

7. The equipment according to claim 6, wherein said cooling means comprise an evaporator extended at least around the side wall of said tub, and an inertial accumulator of cooling energy in thermal contact with said evaporator and extended substantially around the outer surface of said tub.

8. The equipment according to claim 1, wherein said tub is provided with a sliding guide which is made in the thickness of the bottom wall of said tub and is extended according to a sliding direction (W) substantially transverse with respect to the extension direction (X) of said tub, intercepting the exit aperture of said bottom wall, said obturator being slidably inserted in said sliding guide.

9. The equipment according to claim 8, wherein said sliding guide is provided with at least one lower shoulder, on which said obturator is slidably abutted;

said equipment comprising at least one actuating device fixed to said containment structure and mechanically connected to said obturator in order to command the latter to move between said closed position and said open position, and equipped with at least one movement body movable substantially along said sliding direction (W) and provided with an engagement portion, with shaped form, inserted so as to be retained in an engagement seat of said obturator, said engagement seat is provided at the bottom with an insertion opening through which the engagement portion of said moving body is susceptible of being inserted in the engagement seat of said obturator.

10. The equipment according to claim 1, wherein the process seat of said containment structure is provided with an upper opening through which said tub is inserted, in a removable manner, inside said process seat.

* * * * *